UNITED STATES PATENT OFFICE.

HENRY ALFRED HAMEISTER, OF ELKHART LAKE, WISCONSIN.

LIQUID DRESSING FOR LEATHER.

1,214,157.  Specification of Letters Patent.  Patented Jan. 30, 1917.

No Drawing.  Application filed June 28, 1916.  Serial No. 106,455.

*To all whom it may concern:*

Be it known that I, HENRY ALFRED HAMEISTER, a citizen of the United States, residing at Elkhart Lake, in the county of Sheboygan and State of Wisconsin, have invented certain new and useful Improvements in Liquid Dressing for Leather, of which the following is a specification.

My invention relates to an improved belt dressing preparation and to an improved process of dressing belts.

In practising the invention, the ingredients and materials hereinafter mentioned are used and the steps set forth are followed so as to attain the best results from a practical standpoint.

The invention has also been devised with a view to economy from the standpoint of manufacturing and application.

A mixture of rosin and oil is first prepared. While any suitable oil may be used, yet I prefer to employ linseed oil. Preferably the rosin is also crushed or powdered. This mixture is dissolved through the aid of heat and is preferably dissolved by steam, to prevent scorching or boiling over. If one pound of rosin is used, the quantity of oil may be about one pint although the quantity can be varied at will. To this dissolved mixture, pitch is added to the extent of one half an ounce to three ounces, to a pound of rosin, depending upon the strength of dressing desired. This mixture is stirred until the pitch is dissolved. At this stage, if desired, a suitable coloring may be added. Also this mixture may be diluted by the means of oil, say linseed oil, to the desired consistency and for instance the consistency of syrup. The material prepared as set forth, I will term the liquid preparation.

While I prefer to employ mineral pitch, otherwise known as asphaltum, in preparing my composition of matter, nevertheless I have found that vegetable pitch or pitch obtained by boiling turpentine sap or other exudations from trees may be likewise employed with success.

The liquid preparation may be applied by means of a brush or otherwise onto the belt or material and after application, powdered rosin may be sprinkled onto the application so as to be dissolved thereby and dry therewith. While powdered rosin alone may be springled in a dry condition on the application, yet it is usually too strong and hence in many instances I prefer to use a dry mixture of powdered rosin and powdered sugar on the application.

Oftentimes a belt before being dressed with my improved liquid preparation, is painted or coated with a pigment. While the pigment is wet, powdered rosin, or a mixture of powdered rosin and powdered sugar is first sprinkled upon the wet pigment and it is then permitted to dry, after which the liquid preparation is applied. Thereafter if necessary powdered rosin may be sprinkled on the liquid application or a mixture of powdered rosin and powdered sugar may be substituted and sprinkled thereon.

Changes may be resorted to within the spirit and scope of the invention.

I claim:

A liquid dressing for leather comprising one pound of rosin, one pint of linseed oil, and three ounces of pitch.

In testimony whereof I affix my signature in presence of two witnesses.

HENRY ALFRED HAMEISTER.

Witnesses:
 H. G. BMECKTAUER,
 AGNES KACEWIRY,